United States Patent
Maxwell et al.

(10) Patent No.: US 9,568,625 B2
(45) Date of Patent: Feb. 14, 2017

(54) BURIED HYDROPHONE WITH SOLID OR SEMI-RIGID COUPLING

(71) Applicant: CGG SERVICES SA, Massy (FR)

(72) Inventors: Peter Maxwell, Missouri City, TX (US); John Sallas, Plano, TX (US)

(73) Assignee: CGG SERVICES SAS, Massy (FR)

(*) Notice: Subject to any disclaimer, the term of this patent is extended or adjusted under 35 U.S.C. 154(b) by 371 days.

(21) Appl. No.: 14/170,725

(22) Filed: Feb. 3, 2014

(65) Prior Publication Data

US 2014/0254318 A1 Sep. 11, 2014

Related U.S. Application Data

(60) Provisional application No. 61/774,915, filed on Mar. 8, 2013.

(51) Int. Cl.
G01V 1/00 (2006.01)
G01V 1/16 (2006.01)
G01V 1/18 (2006.01)

(52) U.S. Cl.
CPC ............ *G01V 1/162* (2013.01); *G01V 1/166* (2013.01); *G01V 1/168* (2013.01); *G01V 1/181* (2013.01)

(58) Field of Classification Search
CPC ........ G01V 1/162; G01V 1/166; G01V 1/168; G01V 1/181; G01V 1/184
See application file for complete search history.

(56) References Cited

U.S. PATENT DOCUMENTS

| | | | | |
|---|---|---|---|---|
| 3,674,945 A | * | 7/1972 | Hands | G10K 11/02 310/334 |
| 4,534,020 A | * | 8/1985 | O'Brien | G01V 1/16 181/401 |
| 5,105,391 A | * | 4/1992 | Rice | G01V 1/42 181/112 |
| 5,477,101 A | * | 12/1995 | Ounadjela | G10K 9/121 310/328 |
| 5,978,317 A | * | 11/1999 | Whitener | G01V 1/181 181/122 |
| 6,584,038 B2 | | 6/2003 | Meunier | |
| 6,714,867 B2 | | 3/2004 | Meunier | |
| 8,520,469 B2 | * | 8/2013 | Ronnow | G01V 1/364 367/43 |

(Continued)

FOREIGN PATENT DOCUMENTS

WO 2004/095075 A2 11/2004

*Primary Examiner* — Luke Ratcliffe
*Assistant Examiner* — Hovhannes Baghdasaryan
(74) *Attorney, Agent, or Firm* — Patent Portfolio Builders PLLC

(57) ABSTRACT

According to an embodiment, a seismic receiver device is described for use in a borehole surrounded by an ambient material, e.g., rock, mud, etc. The seismic receiver device includes a pressure wave measuring device which is configured to sense pressure changes associated with received seismic waves, a coating layer disposed on the pressure wave measuring device, and an outer layer disposed on the coating layer which is made of a material that is selected to have a bulk modulus number that is substantially similar to a bulk modulus number of the ambient medium. In this way, the acoustic impedance of the device is better matched to the ambient material so that more accurate seismic acquisition may be performed.

11 Claims, 11 Drawing Sheets

(56) References Cited

U.S. PATENT DOCUMENTS

| | | | |
|---|---|---|---|
| 2003/0020919 A1* | 1/2003 | Tweedy | G01H 9/004 356/477 |
| 2003/0086337 A1* | 5/2003 | Constantinou | G01H 3/00 367/167 |
| 2004/0257913 A1* | 12/2004 | Ray | G01V 1/16 367/188 |
| 2005/0000279 A1* | 1/2005 | Yogeswaren | B06B 1/0622 73/152.58 |
| 2006/0236772 A1* | 10/2006 | Naluai | G01H 11/00 73/649 |
| 2007/0152866 A1* | 7/2007 | Nelson | G01S 13/885 342/22 |
| 2009/0321174 A1* | 12/2009 | Endo | E21B 19/22 181/102 |
| 2010/0116059 A1* | 5/2010 | Gan | G01N 29/032 73/592 |
| 2011/0080808 A1* | 4/2011 | Muyzert | G01V 1/20 367/43 |
| 2011/0242943 A1* | 10/2011 | Klinge | H04R 1/44 367/131 |
| 2013/0133408 A1* | 5/2013 | Lang | G01F 1/662 73/64.53 |
| 2013/0258816 A1* | 10/2013 | Sun | G01V 1/008 367/188 |

* cited by examiner

BURIED HYDROPHONE WITH SOLID OR SEMI-RIGID COUPLING

PRIORITY INFORMATION

The present application claims priority under 35 U.S.C. §119(e) to U.S. Provisional Patent Application Ser. No. 61/774,915, filed 8 Mar., 2013, the entire contents of which are expressly incorporated herein by reference.

TECHNICAL FIELD

The present embodiments relate generally to land seismic exploration systems and methods, and more specifically to systems and methods for receivers used in land seismic exploration systems.

BACKGROUND

Seismic waves generated artificially have been used for more than 50 years to perform imaging of geological layers. During seismic exploration operations, vibrator equipment or dynamite (also known as a "source") generates a seismic signal that propagates in the form of a wave that is reflected at interfaces of geological layers. For land seismic surveying, these reflected waves are typically received by geophones, or more generally "receivers", which convert the displacement of the ground resulting from the propagation of the waves into an electrical signal which is recorded. Analysis of the arrival times and amplitudes of these waves make it possible to construct a representation of the geological layers on which the waves are reflected.

FIG. 1 depicts schematically a system 100 for transmitting and receiving seismic waves intended for seismic exploration in a land environment. The system 100 comprises a source 102 consisting of a vibrator operable to generate a seismic signal, a set of receivers 104 for receiving a seismic signal and converting it into an electrical signal and a recorder 106 for recording the electrical signals generated by the receivers. The source 102, the receivers 104 and the recorder 106 are positioned on the surface of the ground 108. FIG. 1 depicts source 102 as a single vibrator but it should be understood that the source may be composed of several vibrators, as is well known to persons skilled in the art.

In operation, source 102 is operated to generate a seismic signal. This signal propagates firstly on the surface of the ground, in the form of surface waves 110, and secondly in the subsoil, in the form of transmitted waves 112 that generate reflected waves 114 when they reach an interface 115 between two geological layers. In a solid medium, the waves radiated by a source (transmitted waves 112) are a combination of P-waves (pressure waves) and S-waves (shear waves). P-waves as they pass through the media produce localized volumetric changes in the media; while, S-waves produce a localized distortion in the media with corresponding particle motion but without any net volumetric change. The surface wave 110 produces a retrograde particle motion in the soil, but there is no local volumetric change associated with it as it propagates. The propagation velocity for surface waves and S-waves is much less than for P-waves. Typically the fraction of P-wave radiated energy from a vertical surface source is about 8%, with surface waves and S-waves comprising the remaining 92% of the total radiated wave energy. Surface waves 110, decay with depth, but they decay more slowly at low frequencies, so they can still have significant amplitude even at 100 m depth for example. Each receiver 104 receives both a surface wave 110 and a reflected wave 114 and converts them into an electrical signal, which signal thus includes a component associated with the reflected wave 114 and another component associated with the surface wave 110. Since system 100 intends to image the subsurface regions 116 and 118, including a hydrocarbon deposit 120, the component in the electrical signal associated with the surface wave 110 is undesirable and should be filtered out. In general, most reflection seismology today use the reflection data associated with P-wave emissions and their reflections. In many cases, S-waves are not used and oftentimes treated as another undesired source of coherent noise. For the case of reservoir monitoring, where a high degree of repeatability may be required, it should be noted that source 102 may be a buried source rather than a surface source. One such reservoir monitoring system that employs buried sources is described in U.S. Pat. No. 6,714,867. Buried receivers can also be useful for monitoring/imaging other oil-field processes like fracture monitoring where the receiver is located closer where a microseismic event might be created by fluid injection; or for passive seismic monitoring in which case the seismic source may be drills, natural phenomena like earthquakes or ocean tides.

Historically, land seismic systems 100 have typically employed geophones as receivers 104. A geophone is a device that converts ground movement into voltage. Geophones use either a spring mounted magnetic mass or a spring mounted coil. More recently an analogous MEMS device has been introduced. The deviation of this measured voltage from a base line is the seismic response which can be analyzed to image the subsurface regions 116, 118 and 120. By way of contrast, hydrophones have typically been employed for marine seismic systems. A hydrophone is essentially a microphone designed to be used underwater for recording or listening to underwater sound. Most hydrophones are based on a piezoelectric transducer that generates electricity when subjected to a pressure change. Such piezoelectric materials or transducers can convert a sound signal into an electrical signal since sound is a pressure wave. Although geophones have typically been used as receivers 104 in land seismic operations, and hydrophones have typically been used as receivers in marine seismic operations, in certain cases these roles have been reversed and indeed today some seismic systems are being designed to use both types of sensors as receivers.

For example, although receivers 104 typically sit on top of the ground in land seismic systems, there is another class of receivers that can be placed in boreholes. These borehole receivers are generally known to those of skill in the art, and an example is described in U.S. Pat. No. 6,584,038 ("the '038 patent") using a hydrophone as the fundamental receiver component. More specifically, as illustrated in FIG. 2 (which is reproduced from the '038 patent), the seismic wave reception device described therein includes a hydrophone 200, and a closed, flexible-walled sheath 202 filled with a liquid 204. The sheath 202 is closed at one end by a sealed plug 206 provided with a sealed duct for a cable 208 which connects the hydrophone 200 to a signal acquisition device (not shown). Because well-designed hydrophones are more sensitive to pressure changes than to particle motion, hydrophones have been found useful for rejecting surface waves and S-waves.

The device shown in FIG. 2 is intended to be tightly coupled with an edge 210 of the medium 212 (e.g., soil and/or rock) in which a borehole having the hydrophone 200 is created for seismic exploration. To accomplish this tight coupling between the hydrophone 200, liquid 204, sheath 202 and the medium 210, 212, a hardenable material 214 (such as cement) is filled in between these elements of the hydrophone receiver device and the edge 210 of the medium 212

While it has been found in general that hydrophones, such as that described in the '038 patent, work well in land seismic applications when they are located below the water table and are fluid coupled with a formation to be imaged, there are many other land seismic applications wherein such constraints would make hydrophones generally, and the receiver device described in the '038 patent specifically, unsuitable. For example, there are many areas that need to be monitored that have very deep water tables, such as deserts, so that it is economically impractical to bury hydrophones at great depth.

Another problem inherent to such a device is that if it is positioned in an area of rock, or some other hardened medium, the use of liquid 204 around the hydrophone creates a mismatch in acoustoelastic properties, much like a cable impedance mismatch in the transmission of electromagnetic signals via cables (especially at microwave frequency signals). Accordingly, some of the pressure information which would otherwise be generated by the seismic waves would be lost in the transfer between the different media. Yet another potential difficulty associated with such a device is that if the liquid 204 leaks out of the device illustrated in FIG. 2, it would become almost useless for its intended purpose of measuring received seismic waves.

Accordingly, it would be desirable to provide methods, modes and systems for a buried land seismic receiver that overcomes at least one or more of these problems.

SUMMARY

An aspect of the embodiments is to substantially solve at least one or more of the problems and/or disadvantages discussed above, and to provide at least one or more of the advantages described below.

It is therefore a general aspect of the embodiments to provide a hydrophone receiver that will obviate or minimize problems of the type previously described. According to a first aspect of the embodiments, a land seismic system includes at least one source configured to generate seismic waves, at least one buried receiver device surrounded by an ambient material and configured to receive the seismic waves, the receiver device including a pressure wave measuring device which is configured to sense pressure changes associated with received seismic waves and to convert the pressure changes into corresponding electric signal, wherein the pressure wave measuring device includes a hollow sphere transducer formed of a piezoelectric material; a coating layer disposed on the said hollow sphere transducer and configured to substantially hermetically seal said hollow sphere transducer; and an outer layer disposed on said coating layer which is made of a material that is selected to acoustically match said ambient medium in which the receiver device is intended to operate, such that a bulk modulus number associated with the material is substantially similar to a bulk modulus number of the ambient medium.

According to a second aspect of the embodiments, a receiver device for use in a borehole surrounded by an ambient material includes a pressure wave measuring device which is configured to sense pressure changes associated with received seismic waves, a coating layer disposed on the pressure wave measuring device, and an outer layer disposed on said coating layer which is made of a material that is selected to have a bulk modulus number that is substantially similar to a bulk modulus number of the ambient medium.

According to a third aspect of the embodiments, a seismic receiver device includes a pressure wave measuring device which is configured to sense pressure changes associated with received seismic waves having an outer layer disposed thereon which is made of a material that is selected to have a bulk modulus number that is substantially similar to a bulk modulus number of an ambient material in which the seismic receiver device is deployed.

BRIEF DESCRIPTION OF THE DRAWINGS

The above and other aspects and features of the embodiments will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
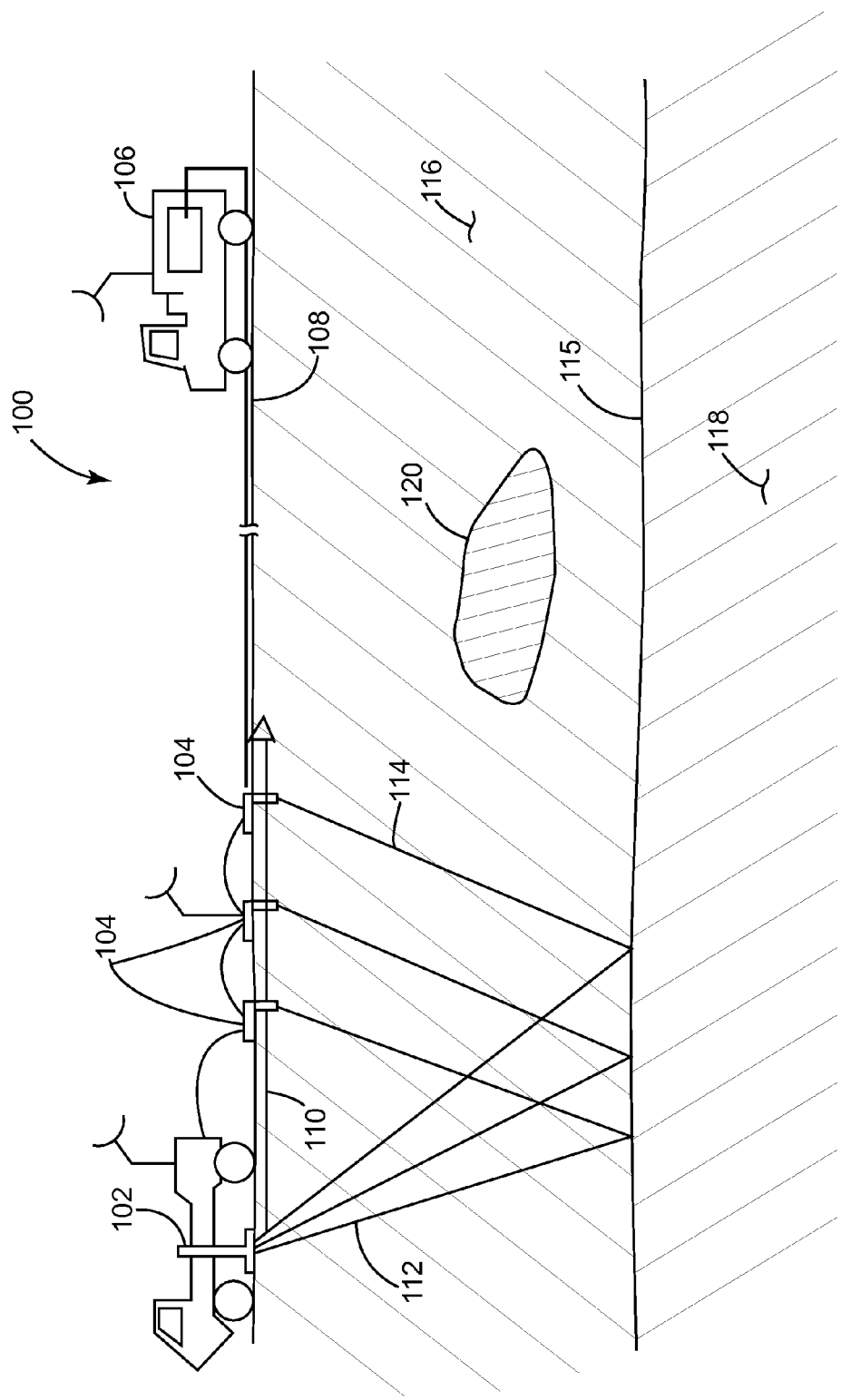
FIG. 1 depicts schematically a device for transmitting and receiving seismic waves intended for seismic exploration in a land environment.
Figure 2:
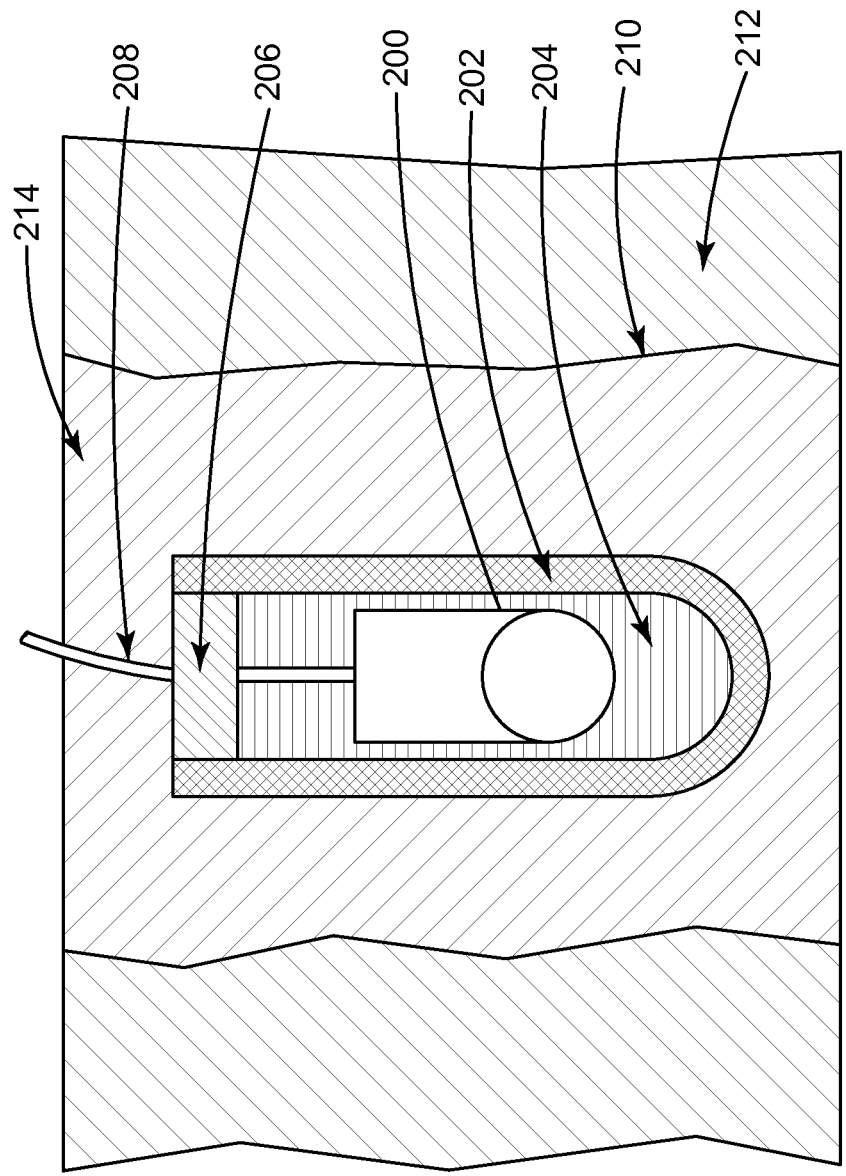
FIG. 2 illustrates a background art buried hydrophone receiver.

The embodiments are described more fully hereinafter with reference to the accompanying drawings, in which embodiments of the novel concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be complete, and will convey the scope of the associated concepts to those skilled in the art. It will be apparent to one skilled in the art, however, that at least some embodiments may be practiced without one or more of the specific details described herein. In other instances, well-known components or methods are not described in detail or are presented in simple block diagram format in order to avoid unnecessarily obscuring the embodiments. The scope of the embodiments is therefore defined by the appended claims. The following embodiments are discussed, for simplicity, with regard to the terminology and structure of a land seismic exploration system, but are not necessarily limited thereto.

Reference throughout the specification to "one embodiment" or "an embodiment" means that a particular feature, structure, or characteristic described in connection with an embodiment is included in at least one embodiment of the present embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

As mentioned above in the Background section, it would be desirable to overcome some of the various problems and difficulties associated with receivers used in seismic acquisition, and in particular where such hydrophone receivers are used, for example, in land seismic acquisition in boreholes or buried systems. Embodiments address this challenge by, among other things, providing a receiver device with a pressure wave measuring device which is configured to sense pressure changes associated with received seismic waves, a coating layer disposed on the pressure wave measuring device and configured to substantially hermetically seal the pressure wave measuring device, and an outer layer disposed on the coating layer which is made of a material that is selected to have a first bulk modulus number that is substantially similar to a second bulk modulus number of the ambient medium. Other embodiments, described below, address the same or similar challenges using different configurations.

Figure 3:
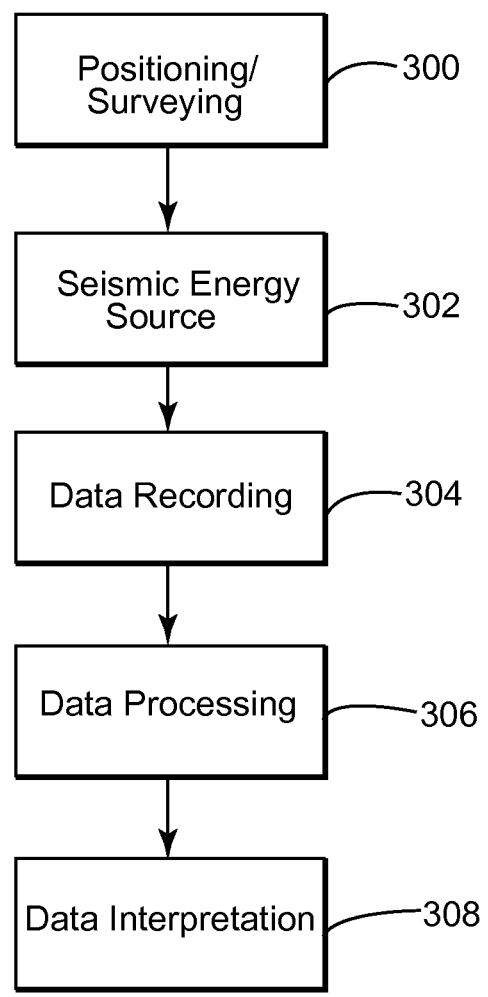
FIG. 3 illustrates a flow chart of a general method for seismic exploration.

Prior to describing such hydrophone receivers according to embodiments in more detail, an additional brief discussion of the overall seismic exploration or acquisition process will first be provided for context. As generally discussed above, one purpose of seismic exploration is to render the most accurate graphical representation possible of specific portions of the Earth's subsurface geologic structure, e.g., using the data which is collected as described above with respect to FIG. 1. The images produced allow exploration companies to accurately and cost-effectively evaluate a promising target (prospect) for its oil and gas yielding potential (e.g., hydrocarbon deposit 120). FIG. 3 illustrates a generalized method for seismic exploration which includes both the acquisition of the seismic data described above, and the subsequent processing of that seismic data to form such images. In FIG. 3, the overall process is broken down into five steps, although one could of course characterize seismic exploration in a number of different ways. Step 300 references the initial positioning of the survey equipment in the geographic area of interest (GAI) and the preparation to begin surveying the GAI in a manner which is precise and repeatable. Seismic waves are generated by the afore-described sources or vibrators (step 302), and data recording is performed on the reflected, scattered and surface waves by the receivers (step 304). As will be appreciated hydrophone receivers, according to the embodiments described below, can be envisioned as impacting both steps 300 and 304, since they will, for example, be positioned in respective boreholes and also perform part of the step of recording the data in their roles as receiver/transducer.

In step 306, processing of the raw, recorded seismic data occurs. Data processing generally involves numerous processes intended to, for example, remove noise and unwanted reflections from the recorded data and involves a significant amount of computer processing resources, including the storage of vast amounts of data, and multiple processors or computers running in parallel. Such data processing can be performed on site, back at a data processing center, or some combination thereof. Finally, in step 308, data interpretation occurs and the results can be displayed or generated as printed images, sometimes in two-dimensional form, more often now in three dimensional form. Four dimensional data presentations (i.e., a sequence of 3D plots or graphs over time) are also possible outputs, when needed to track the effects of, for example, extraction of hydrocarbons from a previously surveyed deposit With this context in mind, an embodiment of a buried receiver, land seismic system will now be discussed with respect to FIGS. 4 and 5. A land seismic system such as that illustrated and described above with respect to FIG. 1 can be used in conjunction with receiver embodiments described herein, with the exception that boreholes 400, each of which contain a separate buried hydrophone system 402, provide seismic wave reception capability as opposed to receivers 104 being disposed on the surface of the area to be surveyed. As those of skill in the art can appreciate, additional boreholes 400 can be included in a given implementation with respective hydrophone systems 402 to cover a desired GAI.

Figure 4:
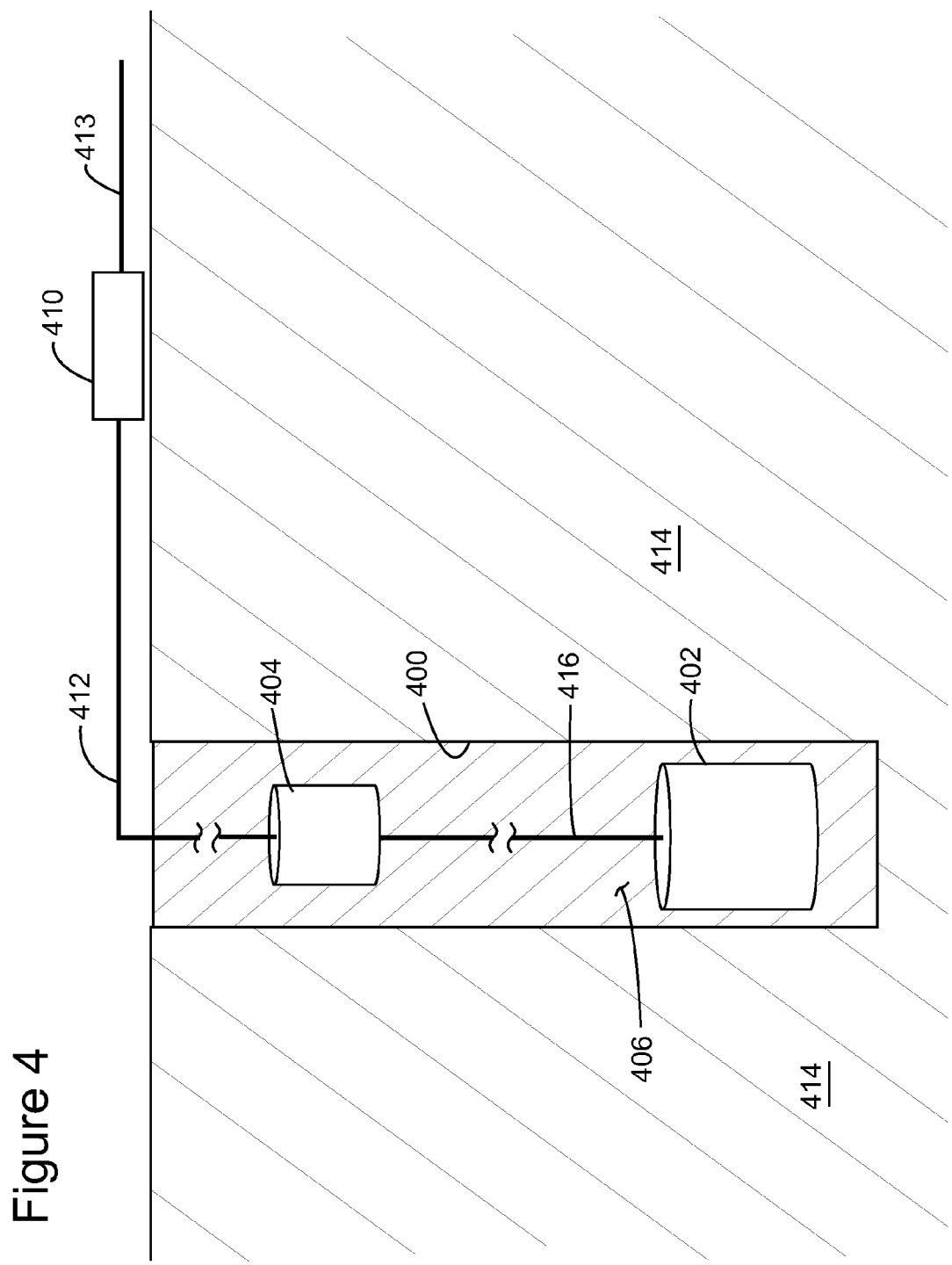
FIG. 4 schematically illustrates a portion of a land seismic system using a receiver system buried in a borehole for receiving seismic waves according to an embodiment.

In this embodiment, the buried hydrophone system as shown in FIG. 4, includes a hydrophone assembly 402, coaxial cable 416, charge amplifier 404, power and signal cable 412, battery interface 410, and cable 413, which connects the buried hydrophone assembly 402 to a data acquisition system, which system is described in greater detail below. As those of skill in the art can appreciate, charge amplifier 404 is but one of several means for receiving and amplifying signals generated by hydrophone assembly 402. Similarly, coaxial cable 416 is but one low noise means for transferring the signals generated by hydrophone assembly 402 to charge amplifier 404 and then to battery interface 410 through cable 412. Charge amplifier 404 may have a differential voltage output; for this case cable 412 may include a shielded twisted pair for the charge amplifier output signal, in addition to wires for supplying power to the charge amplifier. If the system is configured for digital data transfer between battery interface 410 and the data acquisition system 900, battery interface 410 may include an analog to digital converter and a data telemetry device. Borehole 400 also includes solid fill 406, which can be, according to an embodiment, and depending on the surrounding medium 414, cement, grout, plaster, or any combination thereof, or can be other solid materials (or liquefied materials that "cure" or solidify, e.g., fiberglass, plastic, glass, carbon fibers, among others), which is specified to match, as closely as possible, the acoustic properties of the surrounding medium 414 (also referred to herein as "ambient material"), which can be many different types of rock, clay, soil, mixtures thereof, and of course differing amounts of moisture or water in the earth. Although charge amplifier 404 is shown encased in the borehole, it is anticipated that the charge amplifier could be placed elsewhere for easy service access, for the case where a portion of coaxial cable 416 may lay on the surface a low triboelectric noise coaxial cable is preferred. In other embodiments, the hydrophone could be operated in voltage mode rather than charge mode. For this case, charge amp 404 could be replaced by a high-input-impedance-voltage amplifier or by a transformer usually located close to the hydrophone. For these cases cable 416 would contain a twisted pair cable that may or may not be shielded depending on the length of the connection.

Figure 5:
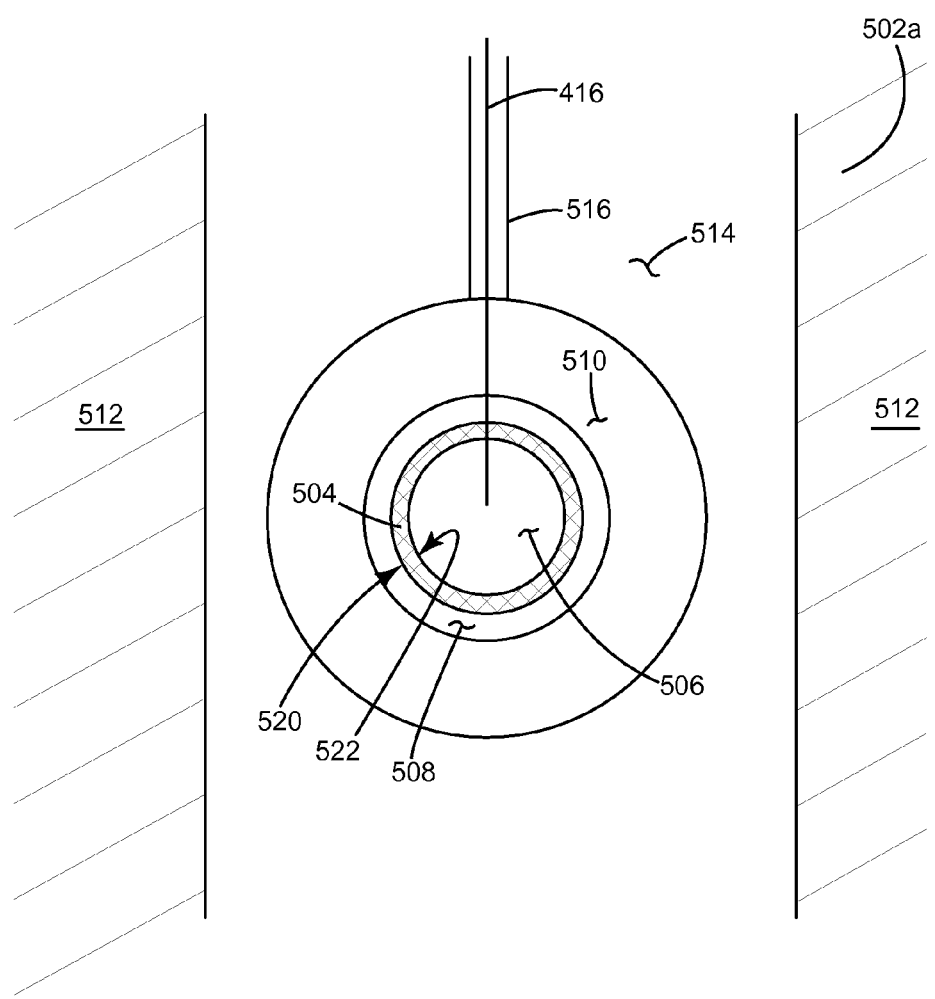
FIG. 5 illustrates a rigid hollow sphere hydrophone assembly according to an embodiment.

Of particular interest in the embodiment of FIG. 4 is the construction of the hydrophone assembly 402 and its ability to closely match the acoustoelastic properties of the surrounding medium 414 so as to reduce interface losses as the seismic waves pass through the medium and put pressure onto the hydrophone assembly 402. According to an embodiment, one geometry that is naturally acceleration canceling and quite rigid, both of which qualities can be useful in a hydrophone receiver, is a hollow sphere. Accordingly, FIG. 5 illustrates a first embodiment of the hydrophone assembly 402 (herein after this first embodiment is referred to as "rigid hollow sphere hydrophone assembly 502a"). The rigid hollow sphere hydrophone assembly 502a includes a hollow sphere transducer 504 that typically has metal electrodes on inner surface 522 and outer surface 520 usually a nickel plating process is used to form these electrodes. The hollow sphere typically has a small hole to allow for electrical connection to its interior that is not shown, so coaxial cable 416 typically will have its center conductor electrically connected to 522 and the coax shield will be connected to outer surface 520. Hollow sphere transducer 504 can, for example, be filled with an elastomer 506, or with dry air. The hollow sphere transducer 504 can be made from a piezoelectric ceramic such as PZT [lead zirconate titanate (Pb[Zr(x)Ti(1−x)]O3)], or barium titanate or lead meta-niobate. The overall apparent stiffness of the hollow sphere is determined by the type of ceramic selected, the hollow sphere diameter and shell thickness; in other words, hollow spheres that have thicker shells generally are better suited for installation in rock formations that have a high bulk modulus while hollow spheres with thinner shells are better suited for installations in more compliant materials formations. Other known piezoelectric materials can alternatively be used to fabricate the hollow sphere transducer 504. According to an embodiment, elastomer 506 could be used in environments that might be subjected to moisture to ensure that the interior surface of hollow sphere transducer 504 is not degraded through oxidation. However, in other cases elastomer 506 may not be needed and is not included. In operation, when pressure waves impact (are received by) the hollow sphere transducer 504, the radius r1 of the hollow sphere transducer 504 will be reduced by a calculable amount as a function of the pressure, which information can be conveyed to the seismic data acquisition system.

Continuing with the description of FIG. 5, applied to the outer surface of hollow sphere transducer 504 in this embodiment is a relatively thin layer of a coating material, i.e., coating layer 508, which according to an embodiment can be an epoxy that protects and electrically insulates hollow sphere transducer 504, e.g., by hermetically sealing the transducer 504 outer electrode 520. Polymers other than epoxy, like acrylic resins could be used for coating layer 508. On top of coating layer 508 is outer layer 510. One function of outer layer 510 is to facilitate pressure transfer between hollow sphere transducer 504 and medium 512 (e.g., rock, soil, etc.) and; in order to do this, the bulk modulus numbers of medium 512 and outer layer 510 should match one another as closely as possible to provide acoustoelastic matching. By matching the bulk modulus numbers of outer layer 510 to solid fill 514 to medium 512, a better coupling coefficient is obtained, and no (or substantially no) loss in sensitivity due to pressure relief is experienced that, in the conventional hydrophone receivers described above, was caused by fluid coupling between the hydrophone and the medium surrounding the borehole. Furthermore, by encasing the epoxy coated hollow sphere with outer layer 510 in the factory, it is easier to ensure good coupling between outer layer 510 and epoxy coating 508. Outer layer 510 presents an increased contact area for improved coupling to solid fill 514. The thickness of outer layer 510 is limited by the fact that it needs to fit in the borehole with a diameter small enough to allow for fill material 514 to get past it to fully encase it. The shape of outer layer 510 is illustrated as a sphere in FIG. 5 but may be elongated or ovoid shaped to promote better flow of fill material around it. Indeed, according to one embodiment, both the solid fill material 514 and the outer layer 510 are made from the same material which is selected to have a bulk modulus number which is as close as possible to that of the medium 512. In another embodiment, outer layer 510 may include additives that are not contained in fill material 514, like polymers to improve the adhesion between 510 and 508 and aggregate material to further increase the outer surface area for better adhesion between 510 and 514. Also shown in FIG. 5 is a rigid conduit 516 which can be provided to protect cable 416 should cable 416 not be suited for direct burial or rigid conduit 516 can be selected to only protect the region a cable splice (not shown) between the electrode wires and the coaxial cable. A strain relief device, not shown, may also be incorporated to protect the exiting cable 416.

Thus it will be appreciated from the foregoing that one aspect of these embodiments is to select a suitable material or materials from which to formulate the outer layer 510 and/or the fill material 514 which fills the borehole after the rigid hollow sphere assembly 502 is disposed therein. Note that outer layer 510 refers to a layer which is "outer" relative to the pressure sensing transducer, e.g., hollow sphere transducer 508, and is not necessarily the outermost layer according to some embodiments. That is, the outer layer 508 may (or may not) also be coated with one or more additional layers.

For example, Table I below lists bulk modulus numbers for different materials that can be used when determining the type of material in which to encase the hollow sphere transducer 504 that is part of buried hydrophone system 502a. Typically a low shrinkage cement or grout is used for fill material 514. In some cases to provide better acoustic matching combinations of aggregate materials with different particle sizes can be used to alter the bulk modulus or acoustic impedance of the material to better match the formation properties. So if there is a priori knowledge about the formation properties and the fill material 514 to be used then outer coating 510 could be adapted to optimize acoustic coupling. However in most applications little prior information is available except whether the transducer will be above or below the water table; located in consolidated material or unconsolidated material. So as a practical matter outer layer 510 is cement, if the hollow sphere is to be located in consolidated formation material that can be above or below the water table. If, for example, a device 504 were pulled from inventory and had an outer layer 510 of cement for installation in an underground formation 512 that had a lower bulk modulus, a fill material 514 could be selected whose bulk modulus has an intermediate value falling between that of medium 512 and cement 510 to help mitigate mismatch issues.

TABLE I

Bulk Modulus for Different Materials

| Alumina | 165-228 GPa |
| Anhydrite | 62 |
| Butyl rubber | 2.7-3 |
| Cement | 45 |
| Clay | 21 |
| Dolomite | 83 |
| Glass | 35-55 |
| Limestone | 69 |

TABLE I-continued

Bulk Modulus for Different Materials

| | |
|---|---|
| Salt | 31 |
| Sand | 38 |
| Steel | 173 |
| Water | 2.2 |

Table II lists bulk modulus numbers for exemplary mediums 512, e.g., for water saturated 5-20% porous rocks in situ, as listed. As discussed above, according to an embodiment, buried hydrophone system 400, 502a should be encapsulated in a material with a bulk modulus number that most closely matches the bulk modulus number of medium 512 that will surround buried hydrophone system 400, 502a so that as little pressure as possible is lost during transference of seismic waves from medium 512 to buried hydrophone system 400, 502a.

TABLE II

Bulk Modulus for water saturated 5-20% porous rocks in situ:

| | |
|---|---|
| Dolomites | 62-34 |
| Limestones | 54-23 |
| Sandstones | 32-18 |

The manner in which the material(s) are selected for the outer layer 510 and/or fill material 514 may vary according to different embodiments. According to one embodiment, the ambient medium 512 can be tested to determine or estimate its bulk modulus number. According to another embodiment, a priori knowledge of the GAI may be used to roughly estimate the bulk modulus number of the medium 512 and one or more materials may be selected based on that knowledge to provide a good acoustic match. According to still another embodiment, a convenient default material (e.g., cement) may be used which will still provide a better acoustic match than, for example water, with respect to most mediums of interest.

Thus, to generalize these (and other) embodiments, the selection of a material which has a bulk modulus number that is substantially similar to a bulk modulus number of the ambient medium, refers herein to a relationship which is better than that provided by using water in a hydrophone device. To numerically quantify this relationship, according to one embodiment and the exemplary numbers provided above in Table 1 and Table 2, the ratio of the bulk modulus number of the ambient 512 relative to the bulk modulus number of the material selected for outer layer 510 is preferably less than nine, according to some embodiments less than five and according to still other embodiments, less than two.

Figure 6:
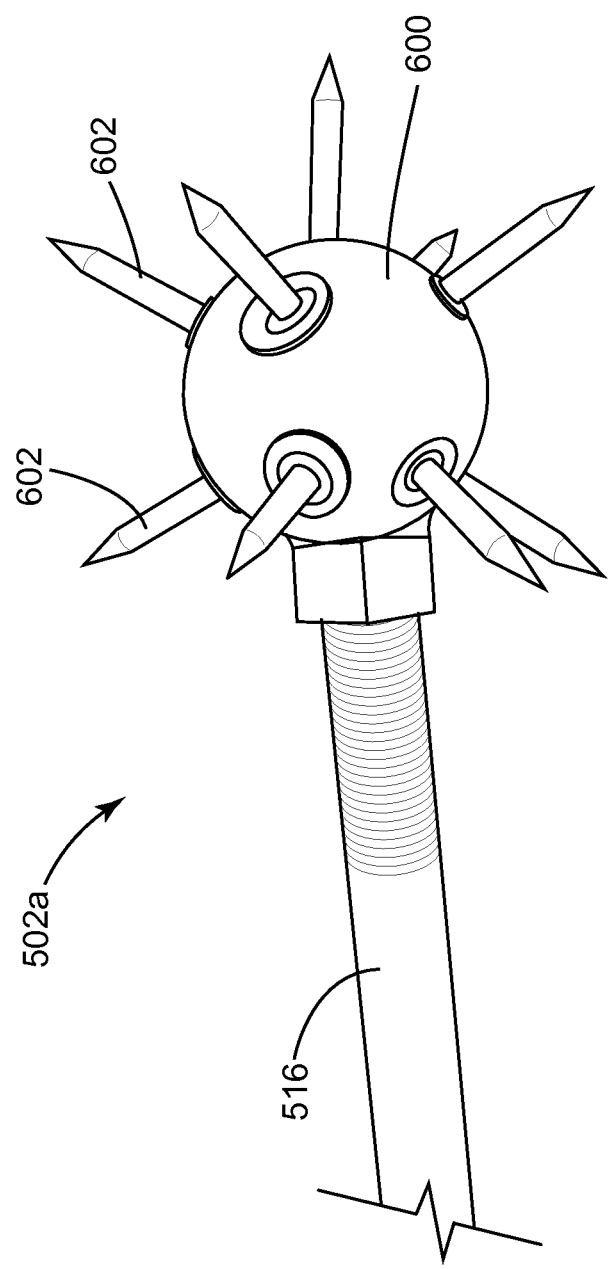
FIG. 6 illustrates the rigid hollow sphere hydrophone assembly as shown in FIG. 5 with spikes for interconnecting with an outer layer according to an embodiment.

FIG. 6 illustrates a sub-assembly 600 of rigid hollow sphere hydrophone assembly 502a in which spikes 602 have been attached to coating layer 508 to ensure good mechanical mating with outer layer 510 according to an embodiment. Spikes 602 facilitate adherence of concentric outer layer 510 to coating layer 508 (and hence to hollow sphere transducer 600). In the example wherein outer layer 510 is cement, spikes 602 can be steel spikes that adhere well to cement and can be attached to coating layer 508 using an epoxy resin. According to an embodiment, there should be no space, or substantially no space between any of hollow sphere transducer 504, coating layer 508, and outer layer 510, to ensure uniform acoustic coupling.

Figure 7:
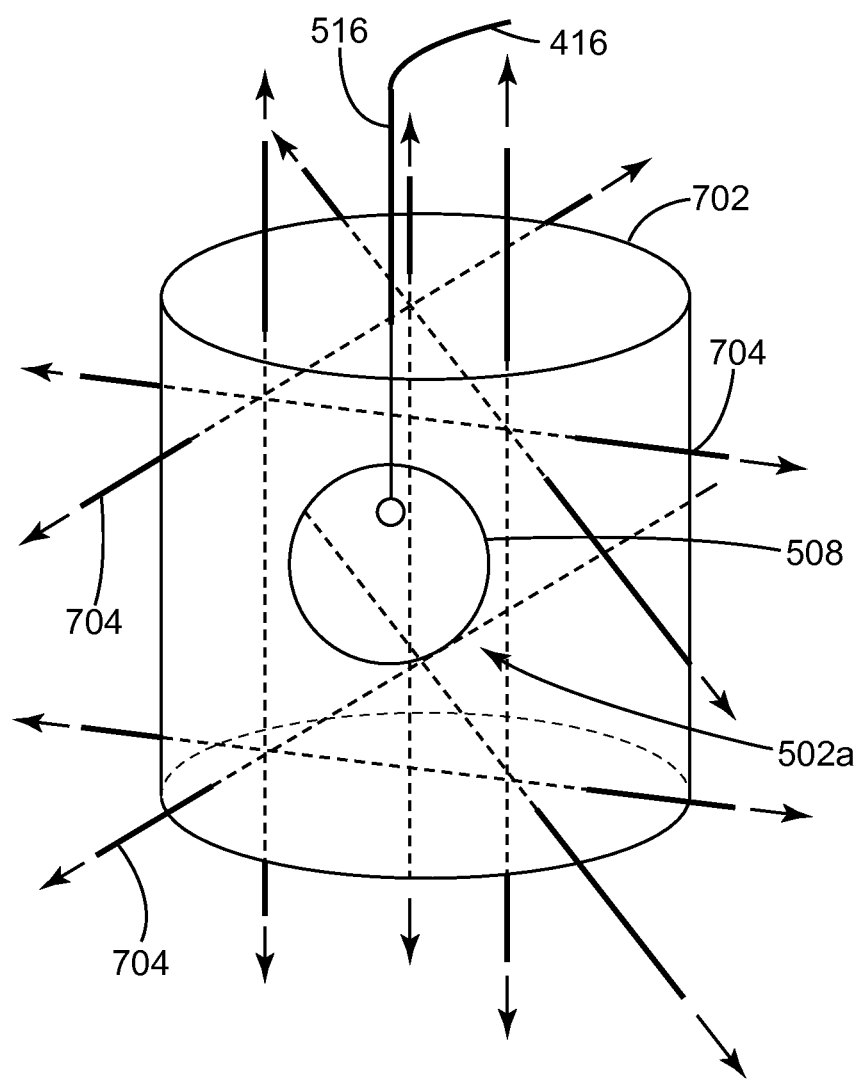
FIG. 7 illustrates a coated rigid hollow sphere hydrophone with pre-tensioned rods in an encasement according to an embodiment.

FIG. 7 illustrates another embodiment wherein the rigid hollow sphere hydrophone assembly 502a has an insulating layer 508, but is also covered with encasement 702. According to this embodiment, encasement 702 can be made of cement, grout, plaster, or other materials, to maintain the bulk modulus matching criteria described above. Within encasement 702 are a plurality of rods 704 that are subjected to tension. For example, casement material can be poured around the pre-tensed rods 704 and allowed to cure. Once the material of encasement 702 is fully cured, the tension on rods 704 is released, and now encasement 702 is placed under a compressive force as rods 704 retract. The compressive force that encasement 702 is subjected to when rods 704 are cut is transferred in part to the interface between encasement 702 and rigid hollow sphere hydrophone assembly 502a, resulting in an improved mating force between them. The mating force further ensures good acoustical coupling between medium 512, solid fill 514, encasement 702, coating 508, and hollow sphere transducer 504. Further, if the cut portions of rods 704 extend an inch or more beyond encasement 702, they will further help to ensure good mating with solid fill 514. According to a further embodiment, the apparatus as shown in FIG. 6 could also be used in the embodiment described in regards to FIG. 5, such that two separate mechanisms exist to ensure good acoustic matching between the surfaces of interest.

According to still a further embodiment, coating layer 508 can also have an aggregate mixed therein that facilitates bonding between itself (and hollow sphere transducer 504) and outer layer 510. Such an aggregate can, for example, be small rocks, beads of glass, plastic, carbon fibers, steel balls, and many other types of materials, aggregates may be selected to have substantial uniform particle size or may utilize a variety particle sizes.

In a different embodiment, an uncured resin layer could be applied to coating layer 508, immediately prior to application of outer layer 510 as another way to improve the bond between layer 508 and outer layer 510. Furthermore to promote bonding between outer layer 510 and solid fill 514, an uncured resin layer could be applied to outer layer 510 just prior to installation/cementation in the borehole.

From the foregoing, it will be apparent that a buried hydrophone receiver according to embodiments can include a spherical piezoelectric ceramic transducer body coated with an outer layer (e.g., cement) that has a bulk modulus value which is substantially similar to that of the medium in which a borehole has been formed and the hydrophone receiver has been buried. This provides only solid-to-solid interfaces through which seismic waves pass enroute to the pressure sensing transducer, as opposed to conventional hydrophone implementations which employ liquid interfaces as described above.

Figure 8:
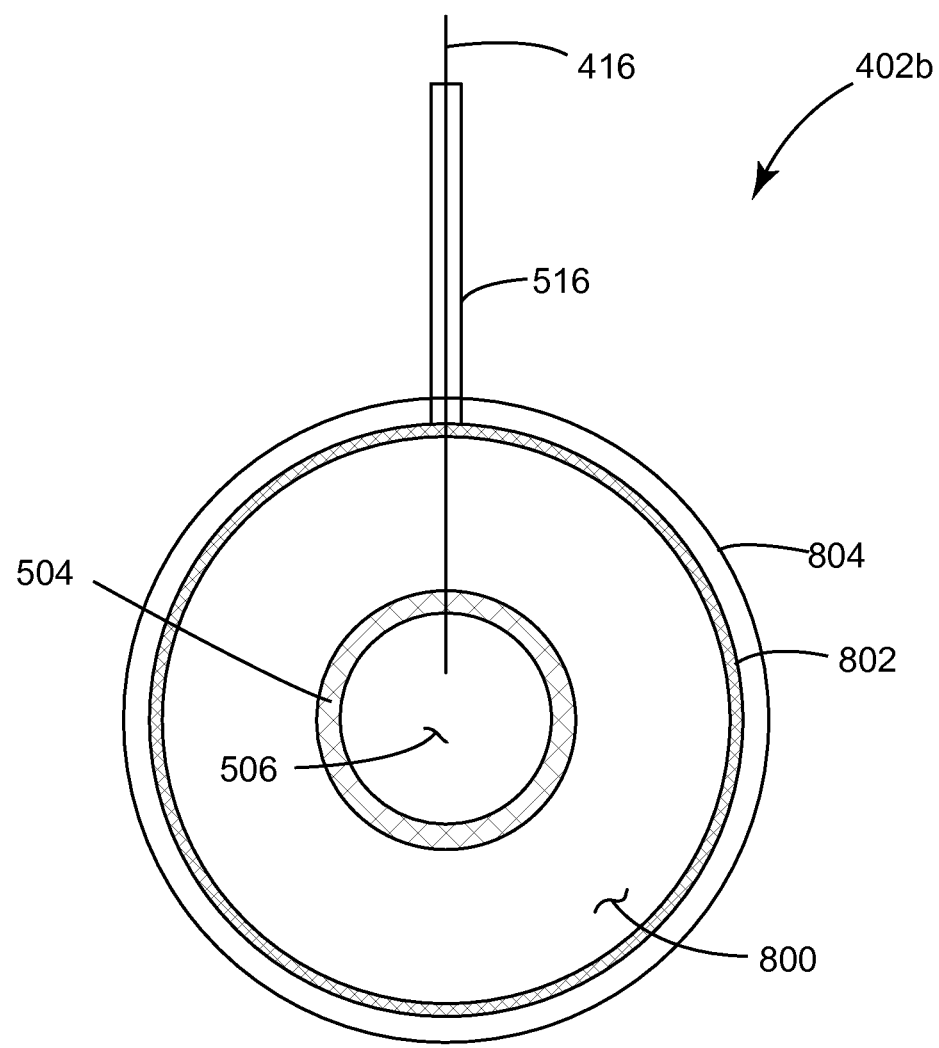
FIG. 8 illustrates a gel-filled hollow sphere hydrophone assembly according to an embodiment.

However, according to a further embodiment which may be used, e.g., in applications involving the burial of one or more receivers in solid or semi-solid materials (which have a lower acoustic impedance than rock, for example dry sand or mud), a gel-filled version of the hydrophone assembly 400 will now be described. For example, FIG. 8 illustrates a gel-filled hollow sphere hydrophone assembly 402b according to an embodiment. Gel-filled hollow sphere hydrophone assembly 402b includes low noise coaxial cable 416 that travels through strain relief/cable coupler or conduit 516 and is connected to hollow sphere transducer 504, which is optionally filled with elastomer 506. Surrounding hollow sphere transducer 504 is a relatively thin epoxy coating, coating layer 508, and surrounding layer 508 is gel 800 (instead of the solid layer 510), which is relatively thick as compared to the other layers. All the aforementioned components fit within a plastic shell 802 which contains the gel layer 800, and optionally another relatively thin layer of epoxy coating, coating layer 804, may be applied to seal shell 802.

According to this embodiment, gel-filled hollow sphere hydrophone assembly 402b can be used in a water saturated sand environment or a mud environment, and then gel 800 can be selected from gel materials that best matches the bulk modulus number (i.e., acoustic matching) of the water saturated sand or mud environment. Further still according to the embodiment, a different type of hollow sphere transducer 504 can be used in gel-filled hollow sphere hydrophone assembly 402b that is more compliant, i.e., one with a thinner wall, than the hollow sphere transducer 504 that is a component of rigid hollow sphere hydrophone assembly 402a described above. For example, the transducer could be comprised of bender type of PZT elements that are thin and are more compliant than a PZT hollow sphere.

Numerous variations and modifications of the afore-described embodiments are possible and contemplated. For example although the afore-described embodiments describe a hydrophone transducer having a spherical shape, other shapes could be used instead. For example, the hydrophone transducer 504 could take the shape of a tetrahedron, dodecahedron, a cylinder, a cube, or any other shape, all of which should be considered to be included in the various embodiments. For example, the faces of the tetrahedron, cube or other shape could be bender type hydrophones that essentially form an array of benders. Benders can be used because they are thin, offer a more compliant transducer and typically have a higher sensitivity than a hollow sphere. The benders can be arranged so that their outputs are additive in response to pressure but effectively cancel sensitivity to acceleration. Having a more compliant sensor will make it better suited to applications where the transducer is installed in lower bulk modulus materials like mud.

Having described various embodiments of hydrophone receivers above, a brief description of a system in which such embodiments can be used, with an emphasis on data processing components, will now be described with respect to FIG. 9. Those skilled in the art will appreciate that the embodiments can, of course, be implanted with other suitable systems as well.

Figure 9:
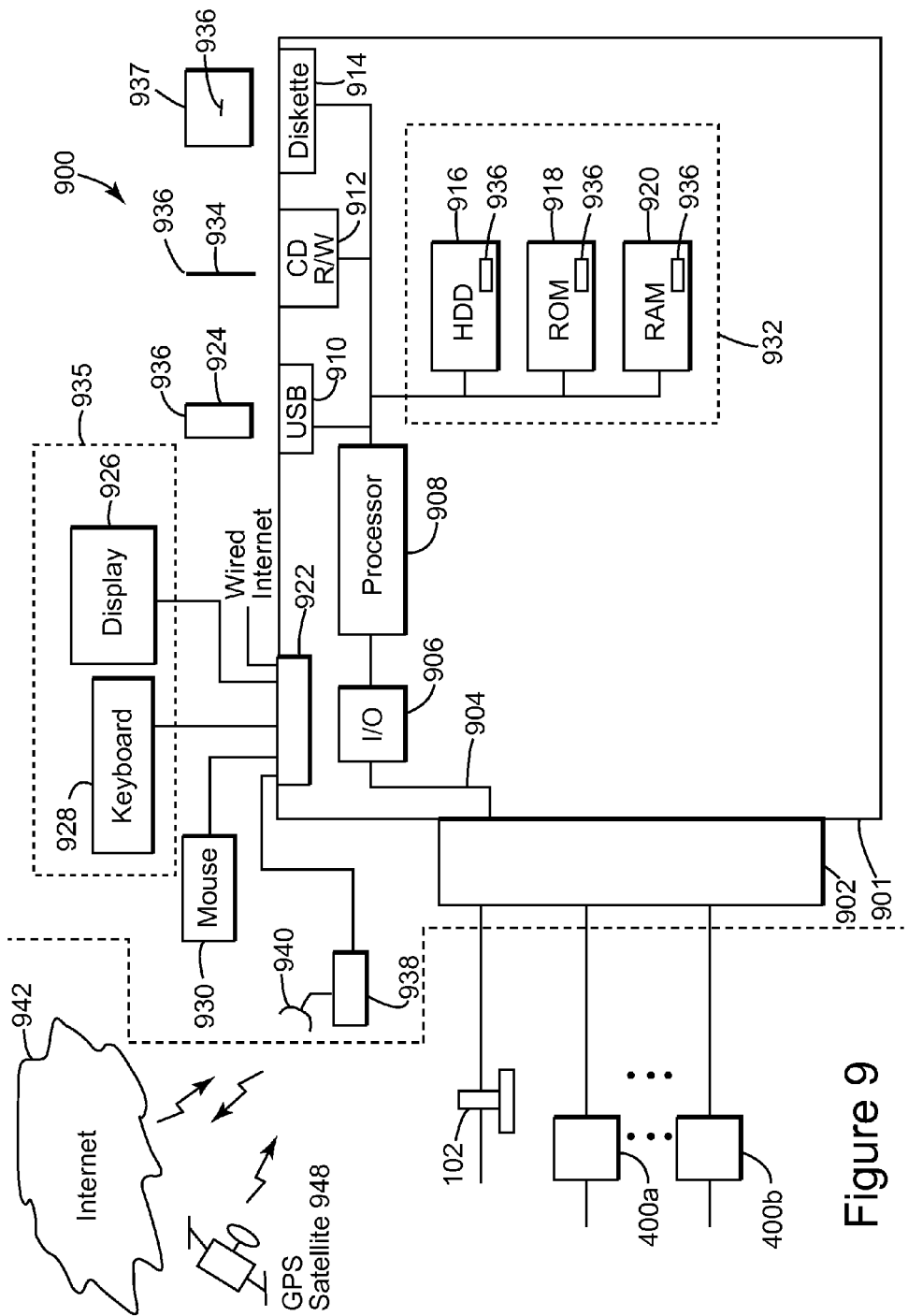
FIG. 9 illustrates a land seismic data acquisition system suitable for use with the buried hydrophone system shown in FIG. 4 according to an embodiment.

Accordingly, FIG. 9 illustrates a seismic data acquisition system 900 including, among other items, server 901, source/receiver interface 902, internal data/communications bus (bus) 904, processor(s) 908 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 910, compact disk (CD)/digital video disk (DVD) read/write (R/W) drive 912, floppy diskette drive 914 (though less used currently, many servers still include this device), and data storage unit 932. For importation of analogue signals through for example cable 413, source/receiver interface 902 may contain analog to digital converters.

Data storage unit 932 itself can comprise hard disk drive (HDD) 916 (these can include conventional magnetic storage media, but, as is becoming increasingly more prevalent, can include flash drive-type mass storage devices 924, among other types), ROM device(s) 918 (these can include electrically erasable (EE) programmable ROM (EEPROM) devices, ultra-violet erasable PROM devices (UVPROMs), among other types), and random access memory (RAM) devices 920. Usable with USB port 910 is flash drive device 924, and usable with CD/DVD R/W device 912 are CD/DVD disks 934 (which can be both read and write-able). Usable with diskette drive device 914 are floppy diskettes 937. Each of the memory storage devices, or the memory storage media (916, 918, 920, 924, 934, and 937, among other types), can contain parts or components, or in its entirety, executable software programming code (software) 936 that can implement part or all of the portions of the data processing associated with step 306 described above. Further, processor 908 itself can contain one or different types of memory storage devices (most probably, but not in a limiting manner, RAM memory storage media 920) that can store all or some of the components of software 936.

In addition to the above described components, system 900 also comprises user console 935, which can include keyboard 928, display 926, and mouse 930. All of these components are known to those of ordinary skill in the art, and this description includes all known and future variants of these types of devices. Display 926 can be any type of known display or presentation screen, such as liquid crystal displays (LCDs), light emitting diode displays (LEDs), plasma displays, cathode ray tubes (CRTs), among others. User console 935 can include one or more user interface mechanisms such as a mouse, keyboard, microphone, touch pad, touch screen, voice-recognition system, among other inter-active inter-communicative devices.

User console 935, and its components if separately provided, interface with server 901 via server input/output (I/O) interface 922, which can be an RS232, Ethernet, USB or other type of communications port, or can include all or some of these, and further includes any other type of communications means, presently known or further developed. System 900 can further include communications satellite/global positioning system (GPS) transceiver device 238 (to receive signals from GPS satellites 948), to which is electrically connected at least one antenna 940 (according to an embodiment, there would be at least one GPS receive-only antenna, and at least one separate satellite bi-directional communications antenna). System 900 can access internet 942, either through a hard wired connection, via I/O interface 222 directly, or wirelessly via antenna 940, and transceiver 938.

Server 901 can be coupled to other computing devices, such as those that operate or control the equipment of vehicles 102,106 via one or more networks. Server 901 may be part of a larger network configuration as in a global area network (GAN) (e.g., internet 942), which ultimately allows connection to various landlines.

According to a further embodiment, system 900, being ostensibly designed for use in seismic exploration, will interface with one or more sources 102 and one or more buried hydrophone systems 400. These, as previously described, are attached to cables 412. As further previously discussed, sources 102 and buried hydrophone systems 400 can communicate with server 901 either through electrical cable 412 (or coaxial cable 416), or via a wireless system that can communicate via antenna 940 and transceiver 938 (collectively described as communications conduit 946).

According to further embodiments, user console 935 provides a means for personnel to enter commands and configuration into system 900 (e.g., via a keyboard, buttons, switches, touch screen and/or joy stick). Display device 926 can be used to show: visual representations of acquired data; source 102 and buried hydrophone system 400 position and status information; survey information; and other information important to the seismic data acquisition process. Source and receiver interface unit 902 can also communicate bi-directionally with sources 102 and buried hydrophone system 400 via communication conduit 946 to receive land seismic data and status information related to sources 102 and buried hydrophone systems 400, and to provide excitation signals and control signals to source 102 and buried hydrophone system 400. As those of skill in the art can appreciate, system 900 can also use surface receivers 104, as described above in regard to FIG. 1, along with one or more buried hydrophone systems 400.

Bus 904 allows a data pathway for items such as: the transfer and storage of data that originate from either the source sensors or streamer receivers; for processor 908 to access stored data contained in data storage unit memory 932; for processor 908 to send information for visual display to display 926; or for the user to send commands to system operating programs/software 936 that might reside in either the processor 908 or the source and receiver interface unit 902.

System 900 can be used to implement methods for signal processing as are known to those of skill in the art. Hardware, firmware, software or a combination thereof may be used to perform the various steps and operations described herein. According to an embodiment, software 936 for carrying out such signal processing can be stored and distributed on multi-media storage devices such as devices 916, 918, 920, 924, 934, and/or 937 (described above) or other form of media capable of portably storing information (e.g., universal serial bus (USB) flash drive 924). These storage media may be inserted into, and read by, devices such as the CD-ROM drive 912, disk drives 914, 916, among other types of software storage devices.

As also will be appreciated by one skilled in the art, the various functional aspects of the signal processing programs may be embodied in a wireless communication device, a telecommunication network, as a method or in a computer program product. Accordingly, the signal processing programs may take the form of an entirely hardware embodiment or an embodiment combining hardware and software aspects. Further, the signal processing programs may take the form of a computer program product stored on a computer-readable storage medium having computer-readable instructions embodied in the medium. Any suitable computer-readable medium may be utilized, including hard disks, CD-ROMs, digital versatile discs (DVDs), optical storage devices, or magnetic storage devices such a floppy disk or magnetic tape. Other non-limiting examples of computer-readable media include flash-type memories or other known types of memories.

Further, those of ordinary skill in the art in the field of the signal processing programs can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the signal processing programs, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The signal processing programs discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertains.

The disclosed embodiments provide a buried hydrophone system 400. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details. For example, the above described embodiments generally describe various types of seismic receivers which can be used for various seismic data acquisition applications. They can be used with any type of seismic source or application including, for example, fracture monitoring, passive seismic monitoring or other oil field activities. For these cases the seismic waves can be generated by any type of mechanism, e.g., natural events or man-made events, such as a drill bit, or fluid injection/fracking.

Figure 10A:
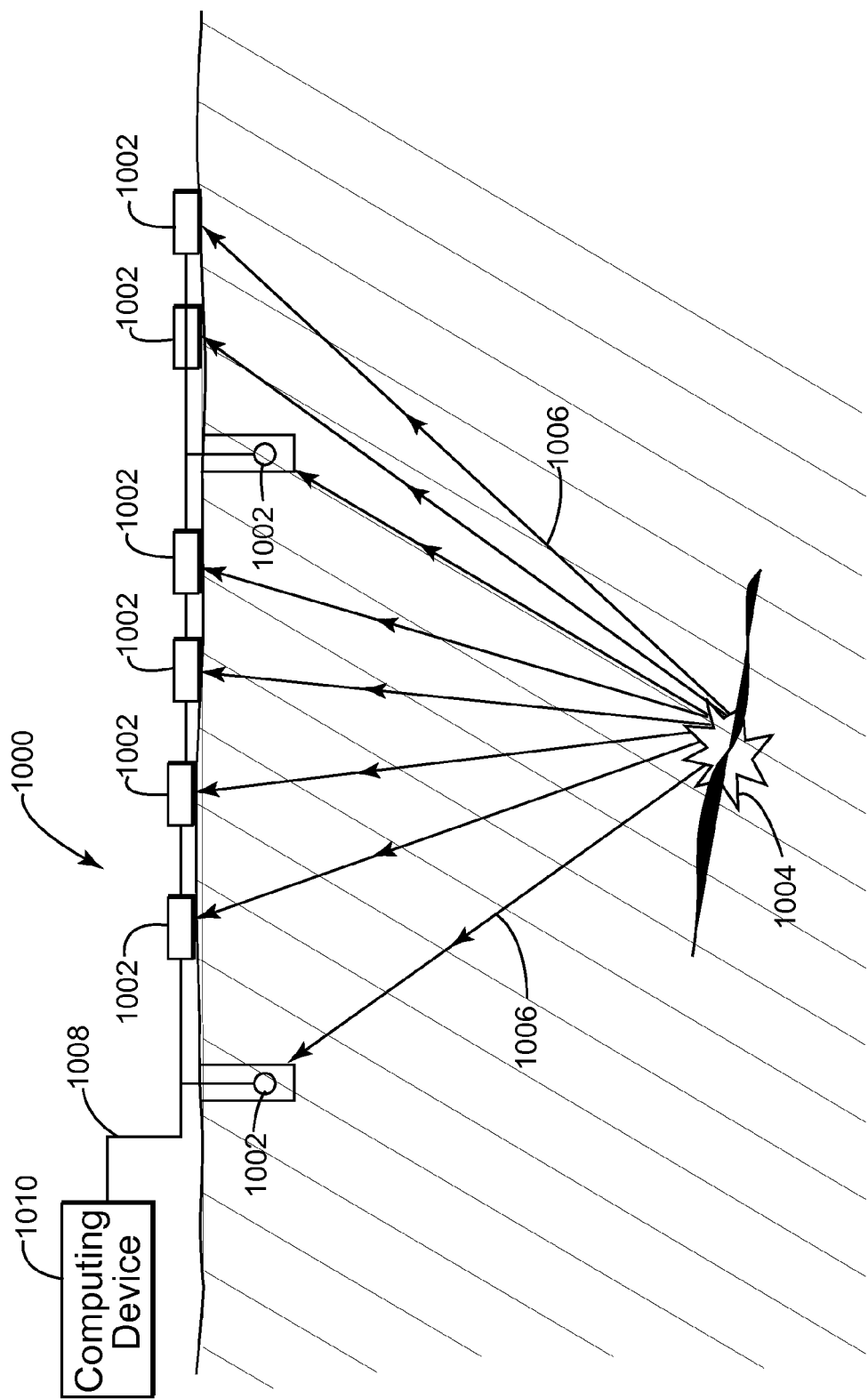
FIGS. 10A and 10B depict various examples of passive monitoring applications in which the embodiments can be employed.

For example, as shown in FIG. 10A, hydrophones according to one or more of the previously discussed embodiments can be used in conjunction with a passive monitoring system 1000. As shown, some of the hydrophones 1002 can be buried in the ambient, while others may be disposed on the surface of the ground. As in the foregoing embodiments one, some or all of the hydrophones 1002 can have an outer layer which is made of a material that is selected to acoustically match said ambient medium in which the receiver device is intended to operate, such that a bulk modulus number associated with the material is substantially similar to a bulk modulus number of the ambient medium. Instead of an active source, e.g., a vibrating source, passive monitoring system 1000 monitors for natural seismic events, e.g., a microseismic event 1004 at a fault point. Acoustic waves, e.g., P-waves 1006, generated by the microseismic event 1004 are then received by the hydrophones 1002 and reported back through the network or cabling 1008 to a computing device 1010 for further seismic data processing as will be appreciated by those skilled in the art.

Figure 10B:
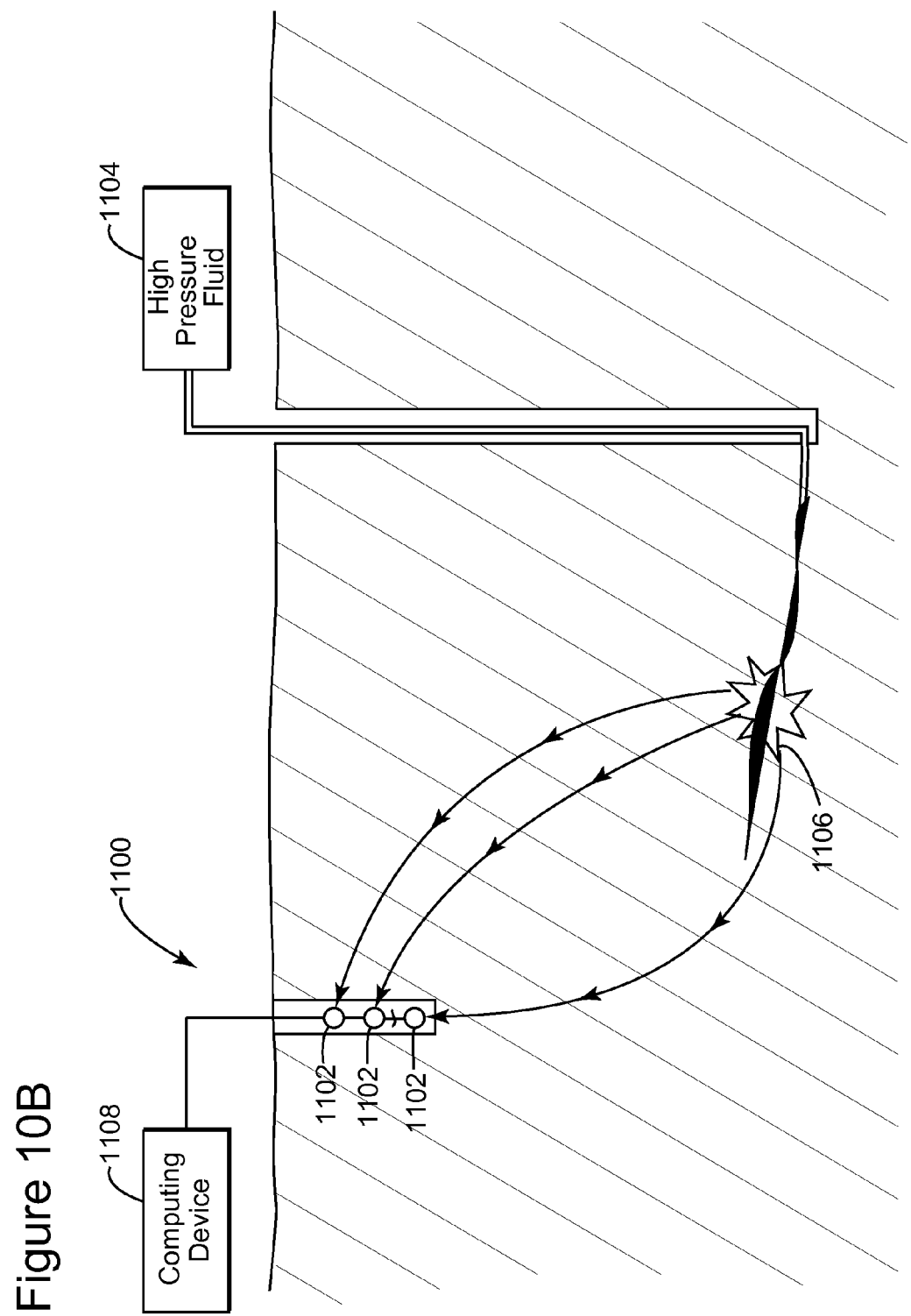

As another example, consider the passive monitoring system 1100 of FIG. 10B, which monitors for acoustic waves generated caused by fluid injection in a fracking application. Therein one or more hydrophones according to the foregoing embodiments are used as downhole receivers 1102 to monitor seismic events associated with the injection of high pressure fluid 1104 into the ground to create small fractures which enhance the migration of a desired hydrocarbon toward a well. As this process continues, microseismic events, e.g., as indicated by 1106 occur which can be usefully monitored to better understand the status of the fracturing process. These events 1106 generate acoustic waves which are received by hydrophones 1102 and passed on to computing device 1108 for further processing, e.g., associated with determining a location and/or type of microseismic event 1106.

Although the features and elements of the embodiments are described in the embodiments in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

We claim:

1. A land seismic system comprising:
   at least one buried receiver device surrounded by an ambient material and configured to receive the seismic waves, the receiver device including:
   a pressure wave measuring device which is configured to sense pressure changes associated with received seismic waves and to convert the pressure changes into corresponding electric signal, wherein the pressure wave measuring device includes a hollow sphere transducer formed of a piezoelectric material;
   a coating layer disposed on the said hollow sphere transducer and configured to substantially hermetically seal said hollow sphere transducer; and
   an outer layer disposed on said coating layer, the outer layer being made of a material that is selected to acoustically match said ambient material in which the receiver device is intended to operate, such that a bulk modulus number associated with the material is substantially similar to a bulk modulus number of the ambient material.

2. The system according to claim 1, further comprising: at least one source configured to generate the seismic waves.

3. The system according to claim 1, wherein the seismic waves are generated by either a natural event or a man-made event.

4. The system according to claim 1, wherein the hollow sphere transducer is made of a piezoelectric material.

5. The system according to claim 1, wherein said coating layer includes a polymer material.

6. The system according to claim 1, further comprising:
   a plurality of spikes fixedly attached to said coating layer and configured to mechanically interconnect said outer layer with said coated hollow sphere transducer.

7. The system according to claim 6, wherein said outer layer comprises:
   a plurality of tensioned rods configured to pre-stress said outer layer into a compressive state, such that a compression force is applied to said coated hollow sphere transducer such that said outer layer is mechanically interconnected with said coated hollow sphere transducer.

8. The system according to claim 1, wherein said outer layer is made of at least one of cement, plaster, and a grout material.

9. The system according to claim 1, further comprising:
   an inner elastomer portion inside said hollow sphere transducer configured to hermetically seal and protect an inner surface of said hollow sphere transducer.

10. The system according to claim 2, wherein the at least one source includes a surface source.

11. The system according to claim 2, wherein the at least one source includes a buried source.

* * * * *